United States Patent
Dougherty

(10) Patent No.: US 9,474,284 B2
(45) Date of Patent: Oct. 25, 2016

(54) HIGH EFFICIENCY FLUID DELIVERY SYSTEM

(75) Inventor: Carl J. Dougherty, Plano, TX (US)

(73) Assignee: TurboChef Technologies, Inc., Atlanta, GA (US)

( * ) Notice: Subject to any disclaimer, the term of this patent is extended or adjusted under 35 U.S.C. 154(b) by 2066 days.

(21) Appl. No.: 11/794,525

(22) PCT Filed: Jan. 25, 2006

(86) PCT No.: PCT/US2006/002335
§ 371 (c)(1),
(2), (4) Date: Jul. 15, 2008

(87) PCT Pub. No.: WO2006/081202
PCT Pub. Date: Aug. 3, 2006

(65) Prior Publication Data
US 2010/0032019 A1    Feb. 11, 2010

Related U.S. Application Data

(60) Provisional application No. 60/647,253, filed on Jan. 26, 2005.

(51) Int. Cl.
F27B 9/06        (2006.01)
A21B 1/00        (2006.01)
F24C 15/32       (2006.01)
A21B 1/24        (2006.01)

(52) U.S. Cl.
CPC .......... *A21B 1/245* (2013.01); *Y10T 137/0318* (2015.04); *Y10T 137/85986* (2015.04); *Y10T 137/86131* (2015.04)

(58) Field of Classification Search
CPC .. H05B 6/6408; H05B 6/6485; H05B 6/745; H05B 6/708; H05B 6/80; A21B 1/245; A21B 1/48; Y10T 137/86131; Y10T 137/85986; Y10T 137/0318
USPC ..... 126/21 A, 21 R; 219/681, 682, 684, 388, 219/400; 426/243, 523; 99/443 C, 451, 386, 99/331; 34/225, 231; 137/1, 565.1, 565.29
See application file for complete search history.

(56) References Cited

U.S. PATENT DOCUMENTS

| | | |
|---|---|---|
| 3,828,760 A | 8/1974 | Farber et al. |
| 4,154,861 A | 5/1979 | Smith |
| 4,227,546 A | 10/1980 | Bergeson |
| 4,327,279 A | 4/1982 | Guibert |
| 4,338,911 A | 7/1982 | Smith |
| 4,462,383 A | 7/1984 | Henke et al. |
| 4,752,268 A | 6/1988 | Kataoka et al. |
| 4,960,100 A * | 10/1990 | Pellicane ............ 126/21 A |

(Continued)

FOREIGN PATENT DOCUMENTS

| | | |
|---|---|---|
| DE | 2557867 A1 | 6/1977 |
| GB | 2043237 A | 10/1980 |

*Primary Examiner* — Hung D Nguyen
(74) *Attorney, Agent, or Firm* — Kilpatrick Townsend & Stockton LLP; Kristin M. Crall; Dean W. Russell

(57) ABSTRACT

A high efficiency fluid delivery system which is particularly useful in delivering temperature-controlled air in convection heating or cooling apparatuses is described. The fluid delivery system provides a fluid circulation means having an intake opening for the fluid and one or more vanes that assist in increasing fluid velocity and reducing turbulent flow.

18 Claims, 3 Drawing Sheets

(56) References Cited

U.S. PATENT DOCUMENTS

| | | |
|---|---|---|
| 5,161,889 A | 11/1992 | Smith et al. |
| 5,401,940 A | 3/1995 | Smith et al. |
| 5,676,870 A | 10/1997 | Wassman et al. |
| 5,717,192 A | 2/1998 | Dobie et al. |
| 6,131,559 A | 10/2000 | Norris et al. |
| RE36,941 E * | 11/2000 | Wolfe et al. ............... 126/21 A |
| 6,369,360 B1 | 4/2002 | Cook |
| 6,403,937 B1 | 6/2002 | Day et al. |
| 6,526,961 B1 * | 3/2003 | Hardenburger ............ 126/21 A |
| 6,874,495 B2 | 4/2005 | McFadden |
| 7,087,872 B1 * | 8/2006 | Dobie et al. ................. 219/681 |
| 2004/0123858 A1 | 7/2004 | McFadden |

\* cited by examiner

HIGH EFFICIENCY FLUID DELIVERY SYSTEM

CROSS REFERENCE TO RELATED APPLICATION

This application is the U.S. national phase application of International Application No. PCT/US2006/002335 filed on Jan. 25, 2006 and published in English on Aug. 3, 2006 as International Publication No. WO 2006/081202 A1 which application claims priority to U.S. Provisional Application Ser. No. 60/647,253 filed Jan. 26, 2005, the contents of which are incorporated herein by reference.

FIELD OF THE INVENTION

The present invention relates to a high efficiency fluid delivery system which is particularly useful in delivering temperature-controlled air in convection heating or cooling apparatuses.

BACKGROUND

The movement of fluids is used in numerous devices and applications to achieve desired results. For example, convection and impingement ovens move heated air or gas into a cooking chamber to enhance the rate of cooking. Impingement freezers move cold air or gas into a freezing chamber to enhance the rate of product freezing. Personal watercraft move water (e.g., water jets) for propulsion. Heater and air conditioners move temperature controlled air. But with many devices, including those listed above, there is a continual demand to achieve higher performance without increasing the size or footprint of the device. Higher performance in devices that operate by fluid movement often times requires higher fluid flow rates. However, significant engineering problems arise when attempting to achieve such higher flow rates within devices that have limited space to handle the fluid flow. Such problems arise when attempting to "turn" the flow of fluid within confined spaces, as fluid turbulence (e.g., rotational turbulence) is created and reduces the efficiency of the circulation means (e.g., a blower).

One area where such problems have been encountered is with impingement ovens. While various conveyorized impingement oven designs are known and available for commercial food service applications, there continues to be demand for higher performance, cost-effective ovens. One approach manufacturers have taken to improve air flow into the cooking cavity is to use multiple blowers. But when one blower is positioned closely to another, or if a blower is positioned in a confined space, air flow (and hence cooking efficiency) is negatively affected due to turbulence, particularly rotational turbulence.

The present invention provides a design for a fluid delivery system that significantly reduces the negative affects of turbulence encountered when fluids are forced to flow and turn in a confined area. In the present application, the fluid delivery system is described in the environment of a conveyor-impingement oven having multiple blower wheels in close proximity to each other, an environment that creates significant rotational turbulence adjacent the blower intakes. However, the solution to reducing turbulence that negatively impacts the efficiency of a fluid blower means described herein is not limited to impingement or convection ovens, but has application to any fluid delivery system.

SUMMARY

According to certain embodiments of the invention, a fluid delivery system comprises a first fluid circulation means having an intake opening for the fluid and at least one vane mounted adjacent to the intake opening. The vane may be disposed in a substantially radial position relative to the center point of the intake opening. The vane may also be disposed in a substantially horizontal position.

According to certain embodiments of the invention, a fluid delivery apparatus comprises first and second blowers, each having lower wheels for circulating temperature-controlled gas within the apparatus and the blower wheels having an intake opening. A motor is preferably connected to, and rotates the shaft of each of the blower wheels. At least one vane is preferably mounted adjacent to the intake openings of each blower wheel. It should be understood that the apparatus may have additional blower wheels, if desired.

BRIEF DESCRIPTION

DETAILED DESCRIPTION OF THE INVENTION

The description of the invention provided below is made with reference to the drawings attached hereto. The drawings have been consecutively numbered as FIGS. 1-3.

Figure 1:
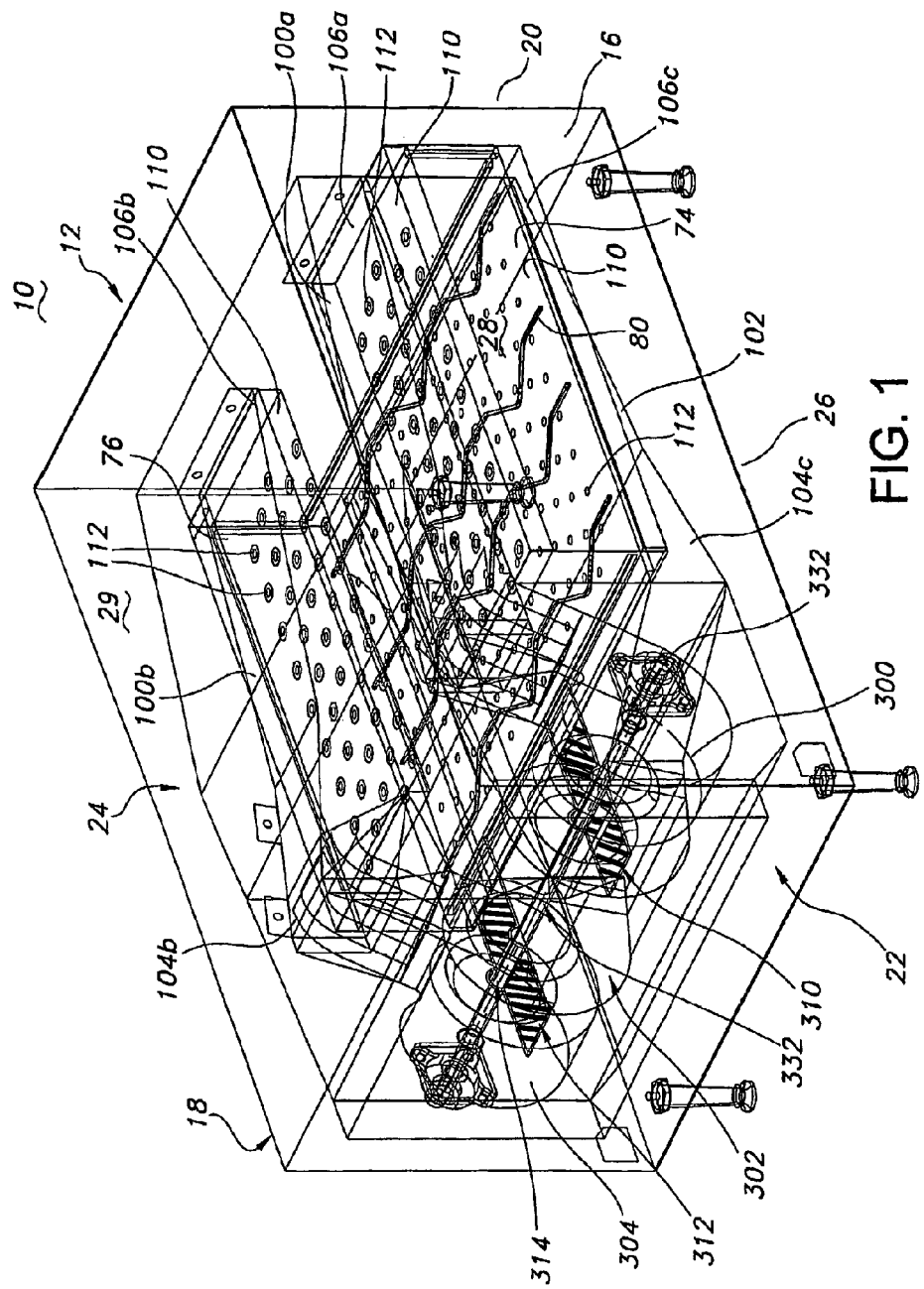
FIG. 1 is a perspective (transparent) view of a fluid delivery system according to certain embodiments of the present invention in a conveyor impingement oven.
Figure 2:
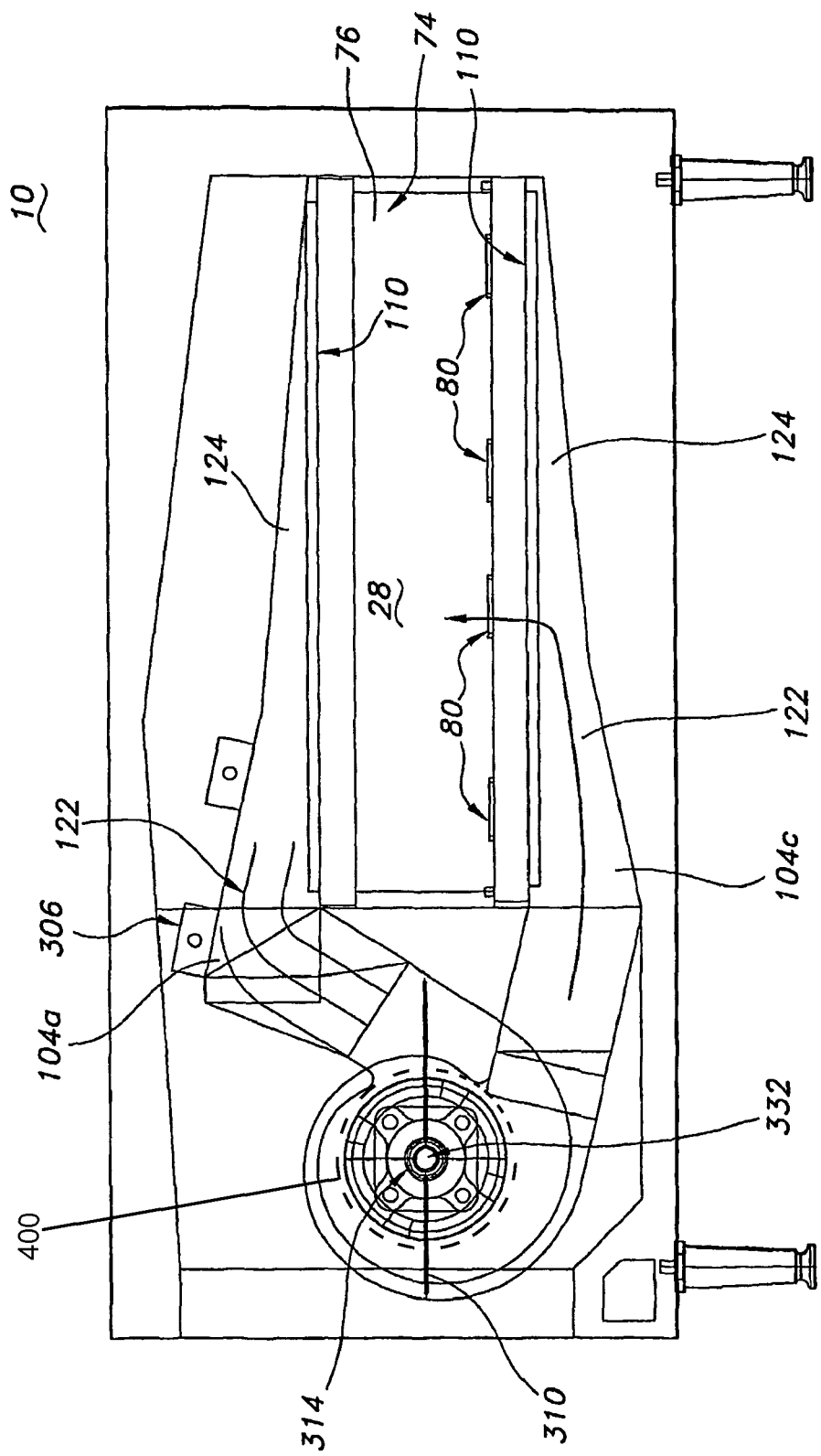
FIG. 2 is a cross-sectional side view of a fluid delivery system according to certain embodiments of the present invention in a conveyor impingement oven.
Figure 3:
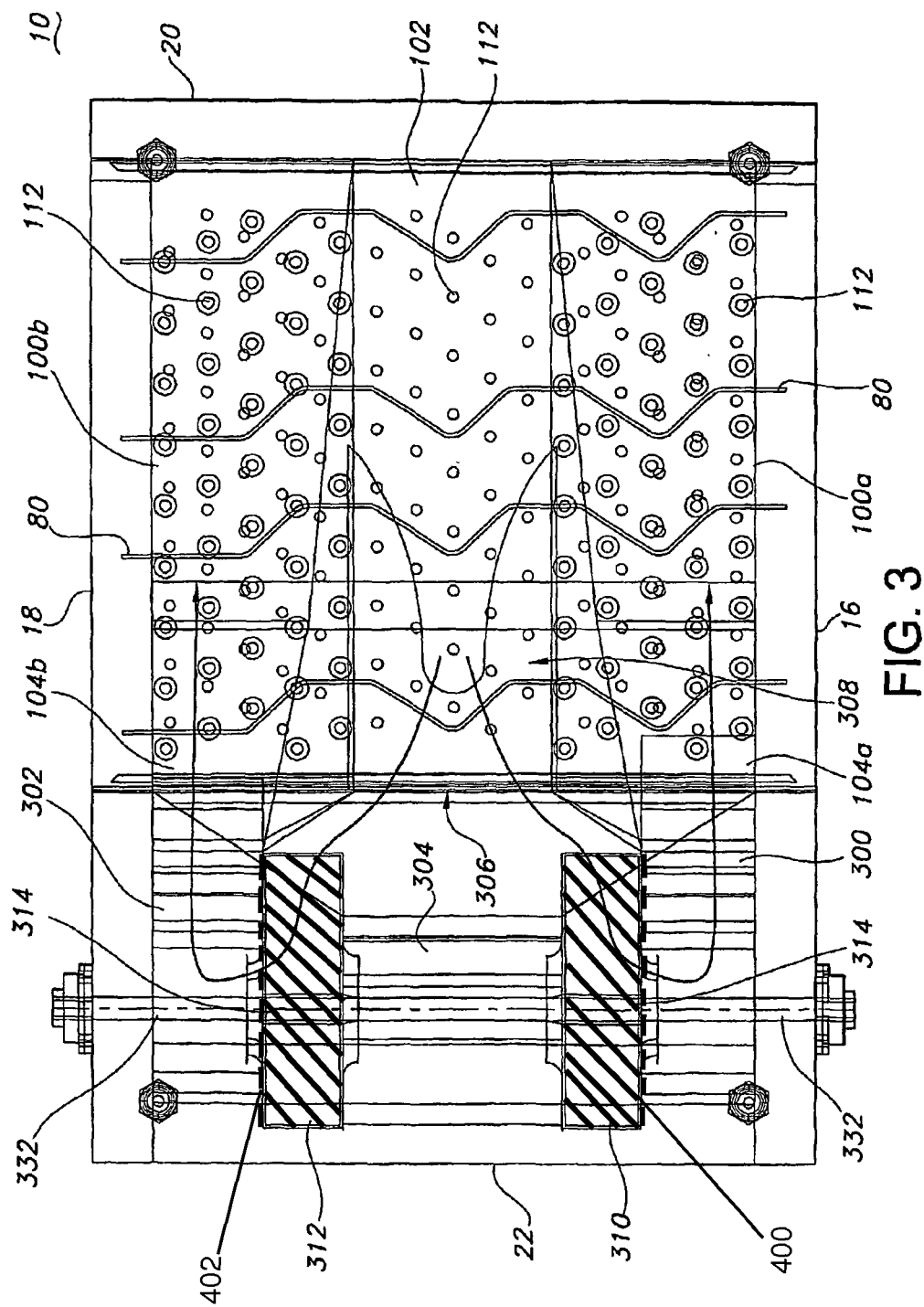
FIG. 3 is a top (transparent) view of a gas delivery system according to certain embodiments of the present invention in a conveyor impingement oven.

In FIGS. 1-3, there is shown a conveyorized impingement oven. As shown, the oven 10 includes an exterior cabinet 12 defined by exterior side walls 16 and 18, exterior front wall 20, exterior rear wall 22, exterior top wall 24, and exterior bottom wall 26 (hereinafter collectively referred to as the "exterior walls 29" of the cabinet or oven). The configuration of cabinet 12 may vary depending upon the type of oven installation. Generally, cabinet 12 will comprise rectangular-shaped exterior walls and be of a box shape. Particularly suitable materials for the exterior walls include aluminized steel and stainless steel. An entrance opening 74 and exit opening 76 are provided in the exterior side walls through which food products may enter and exit the cooking cavity 28.

In the preferred embodiment of the invention, food products are transported into and through cooking chamber 28 by a conveyor (not shown). Conveyor assemblies of conventional design (e.g., see U.S. Pat. No. 4,338,911 and U.S. Pat. No. 4,462,383, hereby incorporated by reference) are suitable. Preferably, the conveyor assembly comprises a continuous loop wire mesh conveyor belt which extends through entrance opening 74 and exit opening 76 in the oven and is horizontally disposed as it travels through cooking chamber 28. A conventional Flat-Flex® stainless steel wire mesh belt is suitable, although other types of belts and materials may be used if desired. The width of the belt is a matter of choice, but belt widths of about 9-32 inches are typical. The conveyor belt can be driven by a conventional variable speed electric motor. FIGS. 1-3 show rods 80, which provide support for the conveyor belt. Preferably, the conveyor belt extends a sufficient distance from the exit and entrance openings in the oven to allow food products to be readily positioned on the conveyor belt for travel through the cooking chamber of the oven and removal upon exiting the oven.

With respect to the conveyance of food product through the oven, it is desirable to incorporate a programmable conveyor speed controller to control cook time. Such controllers are well known in the field of conveyorized impingement ovens. Such controllers, for example, can be calibrated to control the time the food product is to be heated in the oven.

Disposed within cooking chamber 28 are upper air dispensing ducts 100a and 100b positioned above the conveyor belt and a lower air dispensing duct 102 disposed below conveyor belt. These ducts can be constructed of any of several known materials capable of withstanding and performing under the high temperature conditions of the oven, such as, for example, aluminized steels and stainless steels. Ducts 100a, 100b and 102 are hollow and arranged to direct jets of heated air against the surface of food product on the conveyor belt. As shown, the ducts are preferably tapered along their respective longitudinal axes, with the cross sectional area (perpendicular to longitudinal axes) of the ducts being greater at their proximal ends (104a, 104b, 104c) and smaller at their respective distal ends 106a, 106b and 106c. Each of the hollow ducts 100a, 100b and 102 have a perforated surface or jet plate 110 facing the conveyor belt in which orifices or openings 112 are formed. Openings 112 are designed to direct streams of heated air against a food product being transported on the conveyor belt. In a preferred embodiment, the openings 112 comprise circular nozzles.

The size and arrangement of the ducts 100a, 100b and 102 may vary depending on the size of the oven and the desired results. According to certain embodiments, the conveyor width is about 20 inches, the length of the cooking cavity is about 18-22 inches (from interior side wall to side wall), and the vertical distance between the upper duct jet plates and the lower duct jet plate is about 4 inches, which provides about 3 inches between the upper ducts (100a and 100b) and the conveyor belt.

In certain embodiments of the present invention, the ducts 100a, 100b and 102 have a dual taper configuration. As best shown in FIG. 2, the dual tapered ducts preferably have a first tapered portion 122 (adjacent their respective proximal ends of the duct) and a second tapered portion 124 (adjacent their respective distal ends of the duct). As shown, the first tapered portion 122 preferably has a greater angle of taper than the second tapered portion 124 which has a gentler slope. The first tapered portion 122 extends approximately one-third the length of the duct. The degree of taper in the first and second tapered portions may vary. Preferably, the first tapered portion 122 tapers down such that the cross-sectional area of the duct is reduced by one half (i.e., the cross-sectional area at the far end of the first tapered portion is approximately one-half of the cross-sectional area of the proximal end of the duct). The second tapered portion 124 preferably tapers down to about ½ inch in height at the distal end of the duct. This dual taper duct configuration has been found to provide improved evenness of air flow from the openings along the length of the ducts and thus improves evenness of cooking.

Referring to FIG. 3, a plate 308 is disposed between upper ducts 100a and 100b. As shown, the plate is disposed adjacent the proximal ends of the upper ducts and can be described as having a substantially symmetrical "U" or "V" shaped cut-out on the side furthest from the blowers. The purpose of plate 308 is to control the path of air returning to the blowers through opening 306. As shown in FIG. 3, plate 308, with its "U" or "V" shaped cut-out, forces the air from the cooking cavity to exit the cooking cavity at approximately the midpoint between the upper ducts. This serves to balance the air return, minimizing the egress of cooking air out of the oven and the ingress of room air into the oven through the conveyor exit and entrance openings.

As best shown in FIGS. 1 and 3, heated air is circulated within the oven by blower wheels 300, 302 and 304, respectively. Each of the blower wheels is mounted on a common shaft 332, which is driven by a motor (not shown). According to certain embodiments, the shaft 332 has a diameter of about ¾ inches. Although not shown in the figures, the motor that drives the blower shaft 332 can be mounted in any practical position, such as on a bracket below the shaft. Blower wheels 300, 302 and 304 draw heated air from the cooking cavity 28 (through return opening 306) and circulates that air into the ducts 100a, 100b and 102, respectively. Although the fluid (air) circulation means described above is a blower wheel type, other well-known fluid circulation means can be used.

As shown in the figures and described above, the return air flow path is restricted to a confined area requiring the return air to turn at about a 90 degree angle into the blower intake openings 400 in a relatively short distance. When fluids are forced to turn at such severe angles in close proximity to the blower intake 400, turbulence is created, drastically reducing the ability of the blower to produce desired high flow rates. Exacerbating the turbulence in the impingement oven embodiment described above is the close proximity of the blower intakes 400, 402 to each other. It has been discovered, however, that such turbulence and its negative impact on flow rates can be reduced. Disposed at the intake openings 400, 402 of the blowers are vanes 310 and 312. As shown, vanes 310 and 312 span across the intake opening of the blowers and are disposed in a substantially radial position with respect to the center point of their adjacent blower intake openings. According to certain embodiments as depicted in FIGS. 1-3, vanes 310 and 312 are arranged in a substantially horizontal position. The vanes can be mounted to the blower housings by welding or any other suitable means, such as by brackets and screws. Also, as shown in FIGS. 1 and 2, vanes 310 and 312 each have in their respective center regions a u-shaped section 314 corresponding to the shape of shaft 332, which allows the vanes to be better centered across the blower intake openings. The width and thickness of the vanes may vary. In the arrangement shown in FIGS. 1-3, the width of each vane is approximately equal to the distance between the blower housings, the length spans the respective blower intake opening, and the thickness of each vane is about ¹⁄₁₆ of an inch (¹⁄₁₆"). It has been found that a substantially horizontal vane arrangement produces the best results for the blower and return air flow arrangement depicted in FIGS. 1-3 and substantially increases the velocity of air through the ducts when compared with the blower arrangement without the vanes. It is theorized that vanes decrease the rotational turbulence of the air entering the blower intakes, thereby improving air intake and blower efficiency. While it has been observed that the horizontal arrangement of the vanes yields optimum results, the vanes can be tilted from the horizontal and yield improved velocities over the same oven without the vanes.

Another advantage of the vane (310, 312) design depicted herein is that they cover only a small fraction of the area of the blower intake opening. Consequently, the vanes do not substantially restrict the flow of fluid into the blower intakes and do not cause a substantial loss of fluid pressure.

Preferably, the blower motor used to rotate the blower wheels should be capable of blower wheel speeds of 3450 rpm. A ½ horsepower motor is typically suitable. In certain embodiments, blower wheels 300, 302 and 304 are forward-inclined type wheels having a diameter of about 4¾ inches. Also, according to certain embodiments and as depicted in the figures, the width of blower wheels 300 and 302 is about 2½ inches and blower wheel 304 is a double wheel (two 3 inch wheels) having a total width of about 6 inches. In this configuration, blower wheel 304 is designed to intake air on both the left side and right side, blower wheel 300 intakes air on its left side (see FIG. 3, arrow indicating air flow into blower 300) and blower 302 intakes air on its right side (see FIG. 3, arrow indicating air flow into blower 302). It has been found that the blower arrangement described above produces air velocities from the jet plates of about 4700 fpm (feet per minute) and heat transfer rates of about 26 to 27 BTU/(hr.)(sq. ft.)(° F.) (heat transfer rates as measured by a heat transfer measurement device of the type disclosed in U.S. Pat. No. 5,161,889) on the bottom of a food product (conveyor closer to bottom duct) and about 20 BTU/(hr.)(sq. ft.)(° F.) on the top side. The same oven without the vanes produced air velocities of only about 2800 fpm.

The temperature of the circulated air or gas can be produced and controlled by any known means. Gas heated and electrically heated means are the most common. One particularly suitable means to heat and control the temperature of the air is by well known electric heating rods (i.e., Calrod®). According to certain embodiments, the heating elements are of a dual element heater design that can be activated separately or simultaneously for power management. The heating rods can be disposed in any suitable location and can be of an open coil or sheathed type. According to certain embodiments, the heating means are disposed down stream of the cooking cavity return opening and upstream from the blower intake openings.

Although embodiments of the present invention have been described in the context of a conveyor impingement oven, the concept of reducing fluid turbulence at the intake opening of a blower or other fluid circulation means is broadly applicable to other apparatuses which move fluids at high rates. For example, the vane described herein has application to high velocity (e.g., impingement) air freezing devices, impingement batch ovens, air conditioning and heating devices, water jet propelled watercraft, and other devices where rotational turbulence is present at the intake opening(s) of the air circulation means.

The present invention is not limited to the examples illustrated above, as it is understood that one ordinarily skilled in the art would be able to utilize substitutes and equivalents without departing from the present invention.

The invention claimed is:

1. A fluid delivery system comprising:
    a first fluid circulation means, said fluid circulation means having a shaft and an intake opening for intaking said fluid; and
    at least one vane mounted adjacent and external to said intake opening, the vane comprising a rectangular plate-shaped member that is generally centered across the intake opening and having a length that generally spans the intake opening, wherein the at least one vane comprises a center region with a u-shaped section corresponding to a shape of the shaft of the fluid circulation means for centering the vane across the intake opening.

2. The system of claim 1 wherein said at least one vane is disposed in a substantially radial position relative to the center point of said intake opening.

3. The system of claim 1 wherein said vane is disposed in a substantially horizontal position.

4. The system of claim 1 wherein said fluid is a gas.

5. The system of claim 1 wherein said fluid is air.

6. The system of claim 1 wherein said fluid is a liquid.

7. A fluid delivery apparatus comprising:
    a first blower having a first blower wheel for circulating temperature controlled gas within said apparatus, said first blower wheel having an intake opening;
    a second blower having a second blower wheel for circulating temperature controlled gas within said apparatus, said second blower wheel having an intake opening;
    a motor operably connected to and which rotates a shaft, each of said first blower wheel and said second blower wheel being connected to said shaft for rotation of said blower wheels by said shaft; and
    at least one vane mounted adjacent and external to said intake opening of said first blower wheel, the vane comprising a flat plate-shaped member that is generally centered across the intake opening and having a length that generally spans the intake opening of the first blower wheel, wherein the at least one vane comprises a center region with a u-shaped section corresponding to a shape of the shaft for centering the vane across the intake opening of the first blower wheel.

8. The system of claim 7 wherein said at least one vane is disposed in a substantially radial position relative to the center point of said intake opening.

9. The system of claim 7 further comprising a second vane mounted adjacent and external to said intake opening of said second blower wheel, the second vane comprising a flat plate-shaped member that is arranged in a substantially horizontal position and generally centered across the intake opening of the second blower wheel.

10. The system of claim 7 further comprising:
    a third blower having a third blower wheel for circulating temperature controlled gas within said apparatus, said third blower wheel having an intake opening, said third blower wheel being connected to said shaft for rotation of said third blower wheels by said shaft; and
    at least one vane mounted adjacent and external to said intake opening of said third blower wheel, the vane comprising a flat plate-shaped member that is generally centered across the intake opening and having a length that generally spans the intake opening of the third blower wheel.

11. The system of claim 10 wherein each said vane is disposed in a substantially radial position relative to the center point of the intake opening to which it is adjacent.

12. The system of claim 11 wherein each said vane is disposed in a substantially horizontal position.

13. A gas delivery system for a heating or cooling apparatus comprising:
    a first blower having a first blower wheel for circulating temperature controlled gas within said apparatus, said first blower wheel having an intake opening;
    a second blower having a second blower wheel for circulating temperature controlled gas within said apparatus, said second blower wheel having an intake opening;

a third blower having a third blower wheel for circulating temperature controlled gas within said apparatus, said third blower wheel having a first intake opening and a second intake opening;

a motor operably connected to and which rotates a shaft, each of said first blower wheel, said second blower wheel and said third blower wheel being connected to said shaft for rotation of said blower wheels by said shaft;

a first vane mounted adjacent and external to said intake opening of said first blower wheel and said first intake opening of said third blower wheel, the first vane comprising a rectangular plate-shaped member that is generally centered across the intake opening of the first blower wheel, the first vane comprising a center region with a u-shaped section corresponding to a shape of the shaft for centering the first vane across the intake opening of the first blower wheel; and a second vane mounted adjacent and external to said intake opening of said second blower wheel and said second intake opening of said third blower wheel, the second vane comprising a rectangular plate-shaped member that is generally centered across the intake opening of the second blower wheel, the second vane comprising a center region with a u-shaped section corresponding to the shape of the shaft for centering the first vane across the intake opening of the second blower wheel.

14. The system of claim 13 wherein each of said first and second vane is disposed in a substantially radial position with respect to the center point of the intake opening to which it is adjacent.

15. The system of claim 13 wherein each of said first and second vane is disposed in a substantially horizontal position.

16. A fluid delivery apparatus comprising:
a first blower having a first blower wheel for circulating temperature controlled gas within said apparatus, said first blower wheel having an intake opening;
a second blower having a second blower wheel for circulating temperature controlled gas within said apparatus, said second blower wheel having an intake opening adjacent said intake opening of said first blower wheel; and
at least one vane mounted adjacent and external to said intake opening of said first blower wheel and adjacent said intake opening of said second blower wheel, the at least one vane comprising a center region with a u-shaped section corresponding to a shape of the shaft for centering the first vane across the intake opening of the first blower wheel.

17. The system of claim 16 wherein said at least one vane is disposed in a substantially radial position with respect to the center point of the intake opening to which it is adjacent.

18. The system of claim 16 wherein said at least one vane is disposed in a horizontal position.

* * * * *